United States Patent
Lopez et al.

(10) Patent No.: US 8,084,523 B2
(45) Date of Patent: Dec. 27, 2011

(54) PROCESSES AND MANUFACTURING METHODS TO PRODUCE AN AQUEOUS THERMOSETTING FIRE-RATED FIRE-RETARDANT POLYMERIC ADHESIVE COMPOSITION FOR MANUFACTURING INTERIOR OR EXTERIOR FIRE-RATED CELLULOSIC PRODUCTS

(76) Inventors: Richard A. Lopez, Dana Point, CA (US); Bertine Pinckney, San Juan Capistrano, CA (US)

( * ) Notice: Subject to any disclaimer, the term of this patent is extended or adjusted under 35 U.S.C. 154(b) by 0 days.

(21) Appl. No.: 12/500,044

(22) Filed: Jul. 9, 2009

(65) Prior Publication Data

US 2009/0270534 A1    Oct. 29, 2009

Related U.S. Application Data

(63) Continuation of application No. 11/858,427, filed on Sep. 20, 2007, now abandoned, and a continuation of application No. 11/671,761, filed on Feb. 6, 2007, now abandoned.

(60) Provisional application No. 60/846,712, filed on Sep. 22, 2006.

(51) Int. Cl.
*C08K 5/3492* (2006.01)
(52) U.S. Cl. .................. 524/100; 524/140; 524/405
(58) Field of Classification Search .............. 524/140, 524/405, 100
See application file for complete search history.

(56) References Cited

U.S. PATENT DOCUMENTS

| | | | |
|---|---|---|---|
| 4,461,720 | A | 7/1984 | Loyvet et al. |
| 4,472,550 | A | 9/1984 | Reiff et al. |
| 5,340,852 | A | 8/1994 | Pille-Wolf et al. |
| 5,407,980 | A | 4/1995 | Pizzi et al. |
| 5,422,170 | A | 6/1995 | Iwata et al. |
| 5,767,176 | A | 6/1998 | Nakanishi et al. |
| 6,221,978 | B1 | 4/2001 | Li et al. |
| 6,433,059 | B1 | 8/2002 | Capps |
| 6,620,349 | B1 | 9/2003 | Lopez |
| 7,368,171 | B2 | 5/2008 | Bushendorf et al. |
| 2005/0215702 | A1 | 9/2005 | Slark et al. |
| 2006/0084738 | A1 | 4/2006 | Lopez et al. |
| 2006/0084755 | A1 | 4/2006 | Good et al. |

FOREIGN PATENT DOCUMENTS

JP    61268736    11/1986

OTHER PUBLICATIONS

International Search Report dated Sep. 17, 2008 for Application No. PCT/US08/57831.

*Primary Examiner* — Peter Szekely
(74) *Attorney, Agent, or Firm* — Kafantaris Law Offices; Theo Kafantaris

(57) ABSTRACT

Disclosed is a fire-retardant non-corrosive composition, as well as a process for the production of porous materials, wherein the process is conducted in the presence of the said fire-retardant, non-corrosive composition. The fire-retardant, non-corrosive composition of the subject application includes a flame-retardant agent, preservative composition, casein liquid modified melamine resin adhesive, and a monomeric-polymeric MDI catalyst. The composition material and the product resulting from the process of the subject application have fire retardant, non-corrosive properties and protection from fungus and insects.

18 Claims, 1 Drawing Sheet

PLYWOOD

GYPSUM BOARD

PROCESSES AND MANUFACTURING METHODS TO PRODUCE AN AQUEOUS THERMOSETTING FIRE-RATED FIRE-RETARDANT POLYMERIC ADHESIVE COMPOSITION FOR MANUFACTURING INTERIOR OR EXTERIOR FIRE-RATED CELLULOSIC PRODUCTS

CROSS-REFERENCE TO RELATED APPLICATIONS

This application is a continuation application and is based on and claims priority to Continuation-In-Part patent application Ser. No. 11/858,427, filed Sep. 20, 2007 (now abandoned), U.S. Provisional Patent Application Ser. No. 60/846,712, which was filed on Sep. 22, 2006, the entirety of which is incorporated herein by reference; and U.S. patent application Ser. No. 11/671,761, filed Feb. 6, 2007 (now abandoned), the entirety of which is herein incorporated by reference.

BACKGROUND OF THE INVENTION

Cellulosic materials have many desirable properties and for this reason are widely used in wood composite construction materials. Typical construction materials, which are generally defined as manufactured fire-rated cellulosic products, necessitate performance-based tests that strictly comply with approved and mandated fire and quality control testing procedures promulgated by the relevant legislative and regulatory bodies. End use performance-based tests of fire-rated cellulosic products dictate by what means the fire-rated cellulosic products should be manufactured.

Examples of such products include, but are not limited to, oriented strand board (OSB), medium density fiber board, particle board, fiber mat, pressboard, gypsum fiber board, fiber board, cement fiber board, and the like. Typical fire-retardant compositions currently in use include salt compositions, such as phosphates and sulfates, or active ingredients, such as ammonium sulfates. However, the latter have been found to be corrosive to metal, including any metal fasteners, such as staples or nails, used to secure the treated materials.

Natural wood is also known to be a material of choice for building construction due to its strength, appearance, durability, accessibility and non-corrosive nature. However, being highly flammable and having no natural resistance to fungal and/or insect permeation, natural wood also requires special treatment for obtaining specific properties stipulated by the above-mentioned standards.

SUMMARY OF THE INVENTION

This application is directed to fire rated, flame-resistant, aqueous thermosetting, high-density, structural adhesive materials and to methods for incorporating these materials into products through the manufacturing process. The subject application also relates to compositions used to impart fire, fungal and insect resistance to a wide range of cellulosic materials including wood-based fibers and particles, cellulose wafers, wood strands, straw, cane, organic waste products and inorganic waste products.

Thus, in accordance with the present invention, there is provided an aqueous, non-corrosive, fire-retardant composition, which is also resistant to a variety of fungi and insects. This composition includes a pre-blended combination of: i) flame-retardant; ii) a preservative composition; iii) a casein modified liquid melamine formaldehyde resin; and iv) ethylene diphenyldiisocyante (MDI). This composition may be applied to a variety of wood products. The amounts of flame retardant, preservative composition, casein modified liquid melamine formaldehyde resin, and MDI in the composition is determined by stipulated design factors for a given type of wood product. The MDI includes a liquid mixture comprising pure MDI and higher homologs.

In one embodiment, the weight ratio of the flame-retardant to the MDI ranges from approximately 50:1 to 300:1, wherein the weight ratio of the casein modified liquid melamine formaldehyde resin to the preservative composition ranges from approximately 1:1 to 1:10.

In another embodiment, the preservative composition comprises disodium octaborate tetrahydrate. In yet another embodiment, the casein modified liquid melamine formaldehyde resin and is selected from the group consisting of modified melamine and formaldehyde (free formaldehyde concentration of less than 0.5% by weight).

Further, another embodiment of the present invention comprises a material selected from the group consisting of cellulosic material, mineral material, organic waste material, and inorganic waste material. The composition further comprises: i) a flame-retardant; ii) a preservative composition; iii) a casein modified liquid melamine formaldehyde resin; and iv) MDI. The relative amounts of flame-retardant, preservative, casein modified liquid melamine formaldehyde resin, and MDI are determined by stipulated design factors for a given composition material and are known to those skilled in the art.

Still further, in accordance with the present invention, there is provided a process for production of porous materials selected from the group consisting of cellulosic products, such as wood, lumber, plywood, modified density overlay plywood, wood particle board, oriented stand board, mineral fiber board, wood substrates, and cellulose insulation including fiber and panel-type isolations, wherein the process is conducted in the presence of the fire-retardant composition. The amount of the fire-retardant composition is determined by stipulated design factors for a given porous material.

BRIEF DESCRIPTION OF THE DRAWINGS

The subject application is described with reference to certain figures, including.

DETAILED DESCRIPTION OF THE INVENTION

Definitions

Figure 1:
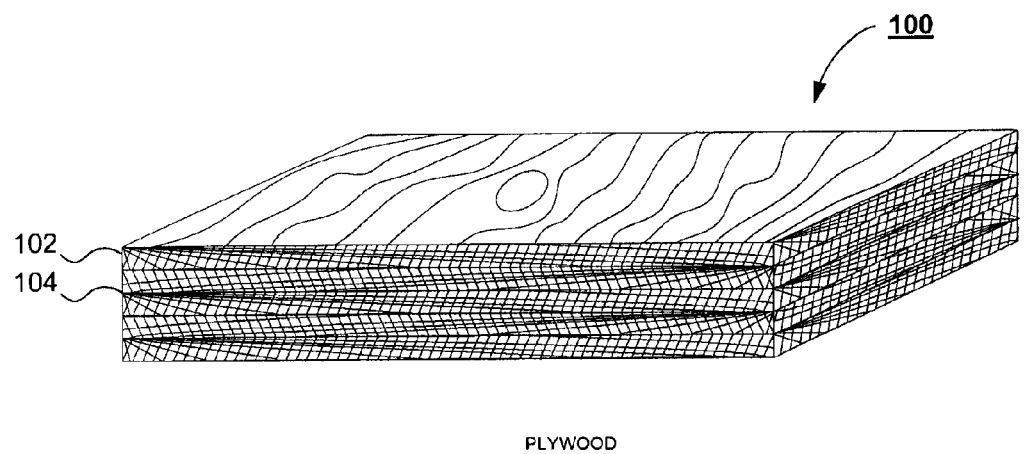
FIG. 1 is an illustration depicting a cellulosic product according to one embodiment of the subject application.

1) "Wood material/composite" is defined as a composite material that comprises wood and one or more other additives, such as adhesives or waxes. Non-limiting examples of wood composite materials include oriented strand board ("OSS"), waferboard, chipboard, particleboard, fiberboard, and plywood and the like. In one embodiment, the wood-based composite is chosen from one of: plywood, laminated veneer lumber, parallel-laminated veneer, a laminated beam, an overlaid material, a wood-nonwood composite, a cellulosic fiberboard, hardboard, particleboard, waferboard, flakeboard, oriented strandboard, and an edge-glued wood-based composite material. As used herein, "flakes", "strands", and "wafers" are considered equivalent to one another and are used interchangeably. In another embodiment, the wood composite materials utilized in this invention are derived from naturally occurring hard or soft woods, singularly or mixed, whether such wood is dried (having a moisture content of between about 2 wt % and about 12 wt %) or green (having a moisture content of between about 30 wt % and about 200 wt %). In another embodiment, the wood composite materials comprise dry wood parts having a moisture content of about 3 to about 8 wt %. Typically, the raw wood starting materials, either virgin or reclaimed, are cut into strands, wafers or flakes of desired size and shape, which are well-known to one of ordinary skill in the art.

2) MDI is defined as ethylene diphenyl diisocyanate. The average functionality of MDI is about 2.7, with a typical viscosity of about 200 mPa at 25° C. An example of a MDI is Lupranate M20 FB™ manufactured by BASF Corporation of Wyandotte, MI.

3) Pure MDI (methylene diphenyl diisocyanate) consists mainly of two isomers: 2,4'-MDI and 4,4'-MDI.

The present invention is directed to fire-retardant materials and to methods for incorporating fire-retardant qualities into products through manufacturing processes. This invention also relates to compositions used to impart flame, fungi and insect resistance to a wide range of cellulosic materials, including, but not limited to, wood-based fibers and particles, cellulose wafers, wood strands, and organic waste products. In one embodiment, the cellulosic material is a wood-based composite chosen from one of: plywood, laminated veneer lumber, parallel-laminated veneer, a laminated beam, an overlaid material, a wood-nonwood composite, a cellulosic fiberboard, hardboard, particleboard, waferboard, flakeboard, oriented strandboard, and an edge-glued wood-based composite material.

The aqueous, non-corrosive, fire-retardant compositions of the present invention also impart to these products resistance to fungi and insects. These fire-retardant compositions include a pre-blended combination of: i) a flame-retardant; ii) a preservative composition; iii) casein modified liquid melamine formaldehyde resin; and iv) MDI. The relative amounts of flame-retardant, preservative composition, casein modified liquid melamine formaldehyde resin and MDI are determined by stipulated design factors for a given composition material.

In addition, the fire-retardant composition of the present invention provides a combination of strength properties as well a significant increase in the structural design value of any fire-rated manufactured cellulosic product.

Manufactured products incorporating the subject application must satisfy and conform with all applicable Building Code Procedures and design requirements promulgated by accredited, accepted and approved testing bodies and quality control agencies, including but not limited to the following:

1. ASTM Designation: D 2559-00: Standard Specification for Adhesives for Structural Laminated Wood Products for Use Under Exterior (Wet Use) Exposure Conditions.
2. ASTM Designation: D 3801-00: Standard Test Method for Measuring the Comparative Burning Characteristics of Solid Plastics in a Vertical Position.
3. ASTM Designation: D 635-03: Standard Test Method for Rate of Burning and/or Extent and Time of Burning of Plastics in a Horizontal Position (Vol. 08.01).
4. ASTM Designation: E 662-03: Standard Test Method for Specific Optical Density of Smoke Generated by Solid Materials (Vol. 04.07).
5. ASTM Designation: D 3014-04: Standard Test Method for Flame Height, Time of Burning, and Loss of Mass of Rigid Thermoset Cellular Plastics in a Vertical Position (Vol. 08.01).
6. ASTM Designation: D 2863-06: Standard Test Method for Measuring the Minimum Oxygen Concentrate to Support Candle-Like Combustion of Plastics (Oxygen Index) (Vol. 08.01).
7. Underwriters Laboratories, Inc.: Test Standard and Method UL 94 Vertical Burning Test; 94V-0.
8. ASTM Designation: D 1037: Standard Test Method for Evaluating Properties of Wood-Base Fiber and Particle Materials I—Accelerated Aging-Per Section 112-118.
9. APA—The Engineered Wood Association: APA Product Standard PS-2 APA Quality Assurance Policies for Structural-Use Panels Qualified to PRP-108.
10. National Building Code of Canada (NBCC) CSA 0112.7-M:ANSI/AHC A190.1.
11. 2003 International Building Code and Standards (IBC): Chapter 23 SECTION 2303—STANDARDS OF QUALITY 7. Adhesives and glues, 7.2. ASTM D 2559, Wet Use Adhesives.
12. 2005 California Building Code and Standards (CBC): Chapter 23 SECTION 2303—STANDARDS OF QUALITY 7. Adhesives and glues, 7.2. ASTM D 2559, Wet Use Adhesives.
13. ICC-ES Acceptance Criteria for Thermoplastic Composite Lumber Products (AC 109) dated June 2006.
14. ICC-ES Acceptance Criteria for Foam Plastic Insulation (AC 12) Approved June 2006.
15. American Wood Preservers' Association Standard (under the jurisdiction of AWPA subcommittee T-7): STANDARD FOR QUALITY CONTROL INSPECTION OF NON-PRESSURE PRESERVATIVE TREATED COMPOSITE WOOD PRODUCTS.
16. American Wood Preservers' Association Standard (under the jurisdiction of AWPA subcommittee T-8): COMPOSITES.
17. Underwriters Laboratories, Inc. Follow-Up Service Procedure (Type R) for a Recognized Component Treatments for Flammability Reduction: Evaluation Testing for Fire-Retardant Composition.
18. Underwriters Laboratories, Inc. Test Title: UL 723
    ASTM Designation: E-84
    Canadian Standard: CAN/ULC-S102M
    Test for Surface Burning Characteristics of Building Materials and Classification.
    Flame Spread and Smoke Developed values for cellulosic structural products applicable to numerical ratings not more than 25
    Flame Spread Index (FSI): 25
    Smoke Density Index (SDI): 25

The Flame-Retardant

The flame-retardant is any appropriate substance that is applied to a combustible material to suppress the flame. Flame-retardants function by reducing the burn rate. There are two types of flame retardants: ones that work well with materials that have a substantial amount of amount of oxygen, such as cellulose; and certain synthetic polymers, that carry out the function in the material itself. And there are those that are effective for materials with carbon-based polymers, such as polyethylene or polyvinyl chloride. Compounds of phosphoric or sulfuric acid are most commonly used as flame retardants for the first class materials. As long as wood, paper, and polymers are in normal use, the acid is neutralized by simple organic substances that vaporize the onset of fire. The other type of flame retardant is made of materials that decompose in the fire intervening with the burning process.

In the present invention, a flame-retardant is a phosphate-based, nitrogen-liberating compound, which releases nitrogen in the presence of a flame. Phosphate-based flame-retardant materials include polyphosphates, such as ammonium polyphosphate (APP). In another embodiment, a flame retardant of the invention comprises ingredients selected from the group consisting of phosphate and nitrogen-based fire-retardants, such as melamine (i.e., 1,3,5-triazine-2,4,6-triamine phosphate).

Another example of a flame-retardant is a boric acid phosphate, having a viscosity of about 20-40 mm$^2$/s (20° C.), a pH ranging from about 3 to about 8, a specific gravity (density) of about 1.0 to about 1.4 g/cm$^3$ (at 20° C.). The flame-retardant is preferably from about 5% to about 70% of the total composition (weight by volume ("w/v"). An example of a suitable flame retardant includes, but is not limited to Melflam 136/12/FR2, manufactured by Degussa Corporation.

Polymeric Methylene Diphenyl Diisocynate (MDI)

The fire-retardant composition further includes MDI. An example of a MDI is Lupranate M20 FB® manufactured by BASF Corporation of Wyandotte, Mich.

It is thought that when the cellulosic wood products are treated with a casein modified liquid melamine formaldehyde resin, the casein modified liquid melamine formaldehyde resin increases the strength properties of the cellulosic wood products. The casein modified liquid melamine formaldehyde resin also provides an impervious moisture barrier for the cellulosic product, suitable for exposure in outdoor/exterior applications. Further, the casein modified liquid melamine formaldehyde resin included in the fire-retardant composition provides non-corrosive properties allowing application of the fire-retardant composition to wood products that are used together with metal fasteners, such as nails, staples, bolts, truss plates, steel connectors, and the like. The MDI generally comprises from about 0.0005% to about 10% of the total composition (w/v).

The casein modified liquid melamine formaldehyde resin generally comprises from about 100:1 to about 1:1 relative to the amount of MDI catalysis. Higher amounts of MDI will cause the casein modified liquid melamine formaldehyde resin to react very quickly at lower reaction temperatures, while lower amounts of MDI will require longer reaction times and higher reaction temperatures.

The Casein Liquid Modified Melamine Resin Adhesive

The casein modified liquid melamine formaldehyde resin generally comprises a waterproof melamine resin, such as 1,3,5-triazine-2,4,6-triamine phosphate.

The casein modified liquid melamine formaldehyde resin is the wood material bonding agent.

The casein modified liquid melamine formaldehyde resin is characterized by a viscosity (at 70-78° F.) ranging from about 600-1000 cP, a pH ranging from about 8.0-10, a free formaldehyde concentration of less than about 0.5% by weight, and a specific gravity of about 1.24 Kg/liter. An example of a suitable casein modified liquid melamine formaldehyde resin includes, but is not limited to, that manufactured by National Casein of Jersey City, N.J., in accordance with delamination requirements and specifications that must comply with ASTM Designation: D 2559-00. Standard Specification for Adhesives for Structural Laminated Wood Products for Use Under Exterior (Wet-Use) Exposure Conditions.

The amount of casein modified liquid melamine formaldehyde resin used in the fire-retardant composition is generally within the range of about 100:1 to about 1:1, relative to the amount of MDI. Higher amounts of MDI catalyst will cause the casein modified liquid melamine formaldehyde resin to react very quickly at lower reaction temperatures, while lower amounts of MDI will require longer reaction times and higher reaction temperatures.

The Preservative

The preservative is comprised of disodium octaborate tetrahydrate. An example of a suitable preservative agent includes, but is not limited to, that manufactured by Quality Borate Co. of Cleveland, Ohio. The preservative agent included in the fire-retardant composition in combination with above described agents, provides resistance to fungi and insects, as well as increased structural rigidity for the treated cellulosic products. The preservative generally constitutes from about 1% to about 80% (w/v) of the total fire-retardant composition.

Additional water-soluble liquid wood preservatives may also be used.

Use of the Fire-retardant Composition with Cellulosic Materials

An example of the fire-retardant composition used in combination with a cellulosic material would typically include the said composition, used to treat a finely divided cellulosic material selected from the group consisting of wood-based fibers and particles, cellulose wafers, wood strands, straw, cane, organic waste products, and inorganic waste products. The fire-retardant composition also provides product resistance to fungi. The amount of fire-retardant composition used to treat the cellulosic material is determined by stipulated design factors for a given composition material. Those skilled in the art will appreciate that the relative amounts of particular agents of the fire-retardant composition are also determined by design factors for a given composition material.

Material Production Process

Also described is a process for the production of porous materials selected from the group of cellulosic products, where the cellulosic products are selected from the group consisting of oriented strand board, medium density fiber board, wood particle board, fiber mat, pressboard, gypsum fiber board, fiber board, cement fiber board, wood, lumber, wood substrates, structural laminated veneer lumber, scaffold planks, laminated glu-lam structural wood beams, plastic laminate(s), pipe insulation, hydraulic additive, foam insulation panel(s), paper, structural plywood, mineral fiber board, modified density overlay, cellulosic installation, insulation (s), including loose fill or panel-type applications. The production process is conducted in the presence of a fire-retardant, non-corrosive aqueous solution. The fire-retardant non-corrosive aqueous solution includes in combination a flame-retardant agent, preservative composition, casein modified liquid melamine formaldehyde resin, and MDI. The amount of the fire-retardant non-corrosive aqueous solution is determined by stipulated design factors for a given porous material.

As will be appreciated by those skilled in the art, the flame-retardant agent, preservative composition, casein modified liquid melamine formaldehyde resin, and MDI, in the composition material of the subject application, are selected analogous to that as described above with reference to the fire-retardant non-corrosive composition. Those skilled in the art will further appreciate that no modification to the process for production of porous materials is necessary other than adding the fire-retardant, non-corrosive aqueous solution of the subject application to a current manufacturing process. No special equipment or machinery is required. The product resulting from the process of the subject application has fire-retardant, non-corrosive properties and is also resistant to fungus and insects. Those skilled in the art will further appreciate that the fire-retardant, non-corrosive composition of the subject application can be applied to existing wood or wood structural members during retrofit or renovation projects as well as manufactured products which are selected from the group consisting of oriented strand board, medium density fiber board, wood particle board, fiber mat, pressboard, gypsum fiber board, fiber board, cement fiber board, wood, lumber, wood substrates, structural wood assemblies, wood particle board doors and wood frames, structural laminated veneer lumber, scaffold planks, laminated glu-lam structural wood beams, plastic laminate(s), pipe insulation, hydraulic additive, foam insulation panel(s), paper, structural plywood, mineral fiber board, modified density overlay, and insulation and combinations thereof.

The following examples are provided to demonstrate a preferred method of preparing and using the fire-retardant non-corrosive compositions in accordance with the subject application.

Example 1.1

Preparing a Fire-Retardant Non-Corrosive Composition

The subject application features a stable, non-corrosive composition for imparting fire, insect and fungus resistant qualities and comprises an aqueous solution selected from a group of fire-rated, flame-resistant constituents and resin adhesive materials.

Relative proportions of the blended fire-retardant, non-corrosive constituents can be adjusted to optimize results based upon the stipulated design factors and the desired characteristics and qualities of the end-use physical and fire-rated cellulosic product. Those skilled in the art will be able to determine, through routine experimentation, the most effective relative percent by weight amounts of the constituents set forth above to create their preferred fire-rated non-corrosive composition.

Example 1.2

Preparing a Liquid Mixture of a Fire-Rated Flame Resistant Aqueous Thermosetting High-Density Structural Adhesive Using the methodology described below, the indicated percent amounts of the blended constituents (flame retardant agent, preservative composition, casein modified liquid melamine formaldehyde resin, and MDI, total weight by volume) together form a liquid mixture of the fire-rated, flame-resistant aqueous thermosetting high-density structural resin composition.

A. To a mixing tank, add 48.98 percent (w/v) of the liquid flame-retardant component Melflam 136/12/FR2®.

B. Add about 30.5 percent (w/v) of the preservative composition Disodium Octaborate Tetrahydrate.

C. Continue mixing with constant stirring until a smooth liquid mixture results.

D. Add 20.33 percent (w/v) of the casein modified liquid melamine formaldehyde resin wood material bonding agent. MB 4650.

E. Continue mixing with constant stirring until a smooth liquid mixture results.

F. Add 0.18 percent (w/v) of the MDI: BASF Lupranate M20 FB.

G. Continue mixing with constant stirring until a smooth liquid mixture results.

H. Transfer blended fire-retardant resin composition to holding tank and store until ready for use.

Example 1.3

Application of a Fire-Retardant Adhesive to a Cellulosic Material

The following example is conducted in compliance with EN ISO 9001:2000;

BS EN ISO:2000; ANSI/ASQ Q9011:2000; for the following scope of registration; 8734 (US): TESTING LABORATORIES (per test conducted by CRT LABORATORIES, INC., ORANGE, Calif. [an UNDERWRITERS LABORATORIES, INC. registered firm, A3135, LWR NO: 16756-R1] on Sep. 15, 2006).

The composition materials listed in Example 1.2, combined as set forth therein, together to form a liquid mixture of the fire-rated flame resistant aqueous thermosetting high-density structural adhesive composition.

SAMPLE DESCRIPTION: Blended proprietary Fire-Retardant Adhesive (polymer) Component and Oriented Strand (OSB) cellulosic material.

TEST PROCEDURES: Underwriters Laboratories, Inc. Test Method UL 94V0 Vertical Flammability Test; Flame Temperature: 843° C. (1,550° F.).

PREPARATION: UL 94 fire test specimens; ½"×5" (1.60-1.64 mm thickness) were culled from a framed mold prepared with a 30 ton hot press operating at 204° C.

RESULTS: The fire-retardant adhesive and combined cellulosic oriented strand (OSB) material is non-flammable.

CONCLUSION: The blended Fire-Retardant Adhesive and Oriented Strand Board (OSB) material conforms to Underwriters Laboratories, Inc. requirements for a fire rating of UL94 V-O.

FIG. 1 shows an example of a cellulosic product manufactured in accordance with the methods described herein, and a fire-rated, flame-retardant, preservative resin composition in accordance with the subject application. As shown in FIG. 1, the cellulosic product, depicted as a standard sheet of plywood 100, comprises two or more thin sheets of wood 102 and a layer of resin 104 lying between the sheets. Thus, as will be understood by those skilled in the art, a first sheet of suitable wood, e.g., Douglas fir, southern yellow pine, pine, oak, maple, or the like, is coated on one surface with the fire-rated, flame resistant, preservative resin composition 104. A second sheet of wood is then laid on top of the first sheet, whereupon the resin 104 on the top of the first sheet adheres to the bottom of the second sheet. This process is repeated until such time as the desired plywood thickness level is achieved, e.g., ¼", ½", ¾", 1", or the like. The last or top sheet, shown in FIG. 1 as the sheet 102, is placed on the top of the stack, with one side in contact with resin layer 104. Thereafter, as will be understood by those skilled in the art of plywood manufacturing, the stacked sheets are compressed, heated and cut to the desired length and width (e.g., 4'×8"). In another embodiment, the cellulosic material is a wood-based composite chosen from one of: plywood, laminated veneer lumber, parallel-laminated veneer, a laminated beam, an overlaid material, a wood-nonwood composite, a cellulosic fiberboard, hardboard, particleboard, waferboard, flake board, oriented strandboard, and an edge-glued wood-based composite material.

Figure 2:
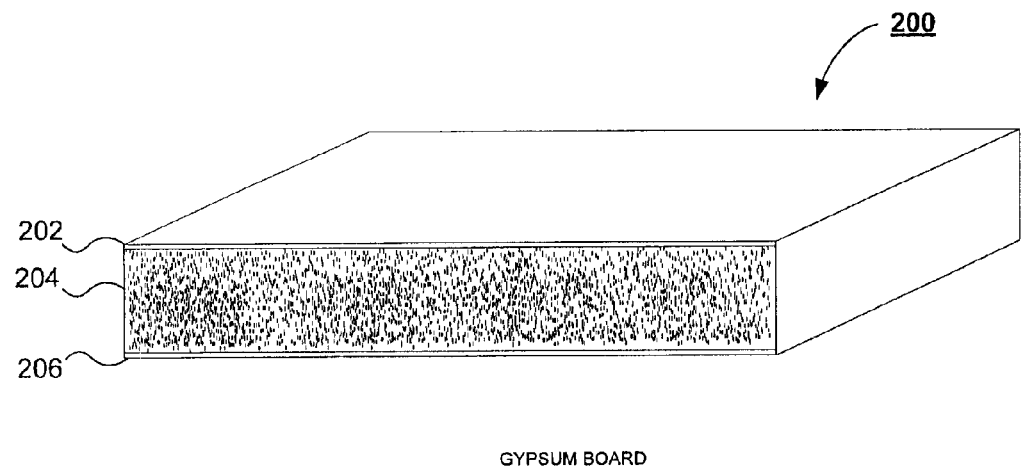
FIG. 2 is an illustration depicting a gypsum product according to one embodiment of the subject application.

FIG. 2 illustrates an example product manufactured in accordance with the methods described herein, and a fire-rated, flame resistant, preservative resin composition in accordance with the subject application. As shown in FIG. 2, the article is shown as a gypsum sheet or board 200, also known as drywall, sheetrock, or the like. The gypsum board 200 includes two sheets of a suitable paper material, sheets 202 and 206, between which is the material 204. Preferably, the sheets 202 and 206 adhere to the material 204 using the fire-rated, flame resistant, preservative resin composition.

The foregoing description of preferred embodiments of the subject application has been presented for purposes of illustration and description. It is not intended to be exhaustive or to limit the subject application to the precise form disclosed. Obvious modifications or variations are possible in light of the above teachings. The embodiments were chosen and described to provide the best illustration of the principles of the subject application and its practical application to thereby enable one of ordinary skill in the art to use the subject application in various embodiments and with various modifications as are suited to the particular use contemplated.

What is claimed is:

1. An aqueous, fire-retardant, non-corrosive composition comprising a pre-blended combination of: a) a flame-retardant agent; b) a preservative composition; c) a casein modified liquid melamine formaldehyde resin; and d) methylene diphenyl diisocyanate (MDI), wherein the composition is to be used for application to wood products.

2. The aqueous fire-retardant composition of claim 1 wherein the flame-retardant agent comprises 1,3,5-triazine-2,4,6-triamine phosphate (Melamine Phosphate).

3. The aqueous fire-retardant composition of claim 1, wherein the preservative composition comprises disodium octaborate tetrahydrate.

4. The aqueous fire-retardant composition of claim 1, wherein the weight ratio of the flame-retardant agent to the MDI ranges from approximately 50:1 to 300:1, and wherein the weight ratio of the casein modified liquid melamine formaldehyde resin to the preservative composition ranges from approximately 1:1 to 1:10.

5. The aqueous fire-retardant composition of claim 1 wherein the casein modified liquid melamine formaldehyde resin comprises a free formaldehyde concentrate of less than 0.5% by weight.

6. A fire-retardant substance comprising: a) a material selected from the group consisting of cellulosic material, mineral material, organic waste material, and inorganic waste material; b) a flame-retardant agent; c) a preservative composition; d) a casein modified liquid melamine formaldehyde resin; and e) methylene diphenyl diisocyanate (MDI); wherein the combination of the flame-retardant agent, the preservative composition, the casein modified liquid melamine formaldehyde resin; and the MDI, are in an aqueous solution; and wherein the composition is to be used for application to wood products.

7. The fire-retardant substance of claim 6 wherein the flame-retardant agent comprises 1,3,5-triazine-2,4,6-triamine phosphate (Melamine Phosphate).

8. The fire-retardant substance of claim 6, wherein the weight ratio of the fire-retardant agent to the MDI ranges from approximately 50:1 to 300:1, and wherein the weight ratio of the casein modified liquid melamine formaldehyde resin to the preservative composition ranges from approximately 1:1 to 1:10.

9. The fire-retardant substance of claim 6, wherein the preservative composition disodium octaborate tetrahydrate.

10. The fire-retardant substance of claim 6, wherein the casein modified liquid melamine formaldehyde resin comprises a free formaldehyde concentrate of less than 0.5% by weight.

11. A method for production of a fire-retardant, insect resistant, and fungus resistant article, comprising the steps of: a) receiving a wood material for incorporation of a fire-retardant, insect-resistant, and fungus-resistant article; b) applying a pre-determined amount of an aqueous, non-corrosive, fire-retardant solution to the wood material, wherein the solution includes a fire-retardant agent, methylene diphenyl diisocyanate (MDI), a casein modified liquid melamine formaldehyde resin, and a preservative composition; and c) assembling a manufactured fire-retardant, insectant-resistant, and fungus-resistant article.

12. The method of claim 11, wherein the fire-retardant agent comprises 1,3,5-triazine-2,4,6-triamine phosphate (Melamine Phosphate).

13. The method of claim 11, wherein the weight ratio of the flame-retardant agent to the MDI ranges from approximately 50:1 to 300:1, and wherein the weight ratio of the casein modified liquid melamine formaldehyde resin to the preservative composition ranges from approximately 1:1 to 1:10.

14. The method of claim 11, wherein the preservative composition is disodium octaborate tetrahydrate.

15. The method of claim 11, wherein the liquid melamine resin has a free formaldehyde concentration of less than 0.5% by weight.

16. The method of claim 11, wherein the wood material is selected from the group consisting of wood-based fibers, wood-based particles, cellulose wafers, wood strands, straw, cane, organic waste products, and inorganic waste products, and combinations thereof.

17. The method of claim 11, wherein the manufactured article is made of a material selected from the group consisting of oriented strand board, medium density fiber board, wood particle board, fiber mat, pressboard, gypsum fiber board, fiber board, cement fiber board, wood, lumber, wood substrates, structural wood assemblies, wood particle board doors and wood frames, structural laminated veneer lumber, scaffold planks, laminated glu-Iam structural wood beams, plastic laminate(s), pipe insulation, hydraulic additive, foam insulation panel(s), paper, structural plywood, mineral fiber board, modified density overlay, and insulation and combinations thereof.

18. The method of claim 11, wherein the manufactured article is a wood-based composite selected from the group consisting of plywood, laminated veneer lumber, parallel-laminated veneer, laminated beam, overlaid material, wood-nonwood composite, cellulosic fiberboard, hardboard, particleboard, waferboard, flakeboard, oriented strandboard, and edge-glued wood-based composite material.

* * * * *